(12) United States Patent
Stephens et al.

(10) Patent No.: US 10,058,089 B1
(45) Date of Patent: Aug. 28, 2018

(54) ELECTROMECHANICAL HORN FOR DETERRING ANIMALS

(71) Applicants: Leah Stephens, Conroe, TX (US); John Stephens, Conroe, TX (US); Matthew T. Fisher, Reno, NV (US)

(72) Inventors: Leah Stephens, Conroe, TX (US); John Stephens, Conroe, TX (US); Matthew T. Fisher, Reno, NV (US)

( * ) Notice: Subject to any disclaimer, the term of this patent is extended or adjusted under 35 U.S.C. 154(b) by 0 days.

(21) Appl. No.: 15/362,790

(22) Filed: Nov. 28, 2016

Related U.S. Application Data (63) Continuation-in-part of application No. 13/548,185, filed on Jul. 12, 2012, now Pat. No. 9,504,233.

(51) Int. Cl.
| | |
|---|---|
| *A01M 29/16* | (2011.01) |
| *A01K 15/02* | (2006.01) |
| *G10K 9/122* | (2006.01) |
| *G05B 15/02* | (2006.01) |

(52) U.S. Cl.
CPC ........... *A01M 29/16* (2013.01); *A01K 15/021* (2013.01); *A01K 15/022* (2013.01); *G05B 15/02* (2013.01); *G10K 9/122* (2013.01)

(58) Field of Classification Search
CPC ........ A01M 29/16; G05B 15/02; G10K 9/122
USPC ....................................................... 119/719
See application file for complete search history.

(56) References Cited

U.S. PATENT DOCUMENTS

| | | | |
|---|---|---|---|
| 3,058,103 A | 10/1962 | Evans | |
| 3,683,113 A | 8/1972 | Stewart | |
| 4,689,776 A | 8/1987 | Thorndyke et al. | |
| 4,769,794 A | 9/1988 | Beuter et al. | |
| 4,903,929 A | 2/1990 | Hoffman | |
| 5,061,918 A | 10/1991 | Hunter | |
| 5,196,829 A | 3/1993 | Janis | |
| 5,278,537 A | 1/1994 | Carlo et al. | |
| 5,351,653 A | 10/1994 | Marischen et al. | |
| 5,602,523 A | 2/1997 | Turchieo et al. | |
| 6,406,049 B1 | 6/2002 | Jimison et al. | |
| 6,677,853 B1 | 1/2004 | Canfield | |
| 6,750,758 B2 | 6/2004 | Duncan et al. | |
| 7,042,340 B2 | 5/2006 | Ewert et al. | |

(Continued)

OTHER PUBLICATIONS

Dazer (TM) and Dazer II (TM), K-II Enterprises, www.kiienterprises/dazer.html.
Falcon Safety Products, www.falconsafety.com.

*Primary Examiner* — Joshua D Huson
(74) *Attorney, Agent, or Firm* — Kenneth A. Roddy (57) ABSTRACT

An electromechanical horn having a generally L-shaped housing containing a sound generating system including a piezoelectric speaker generates a series of short, audible sound signals in a repetitive pattern, the generated sound signals having fundamental frequencies with associated harmonic component frequencies and decibel levels that fall within a frequency range of from about 3 kHz to about 10 kHz, and decibel levels in a range of from about 75 dB to about 115 dB to disperse or deter an aggressive animal in a non-detrimental manner. The lower portion of the horn is configured to be held in the palm of a hand of a user. A strap mounted on the back side of the housing forms a loop that can be grasped by the palm of the user's hand, or extended over the back of the hand, and a depressible thumb button disposed at the back end of the upper portion receives the user's thumb.

7 Claims, 3 Drawing Sheets

(56) References Cited

U.S. PATENT DOCUMENTS

| | | | |
|---|---|---|---|
| 7,098,775 | B2 | 8/2006 | Perlo et al. |
| 7,841,291 | B1 | 11/2010 | Milanovich |
| 8,737,169 | B1 | 5/2014 | DeWitt |
| 9,504,233 | B2 * | 11/2016 | Stephens .............. A01K 15/021 |
| 2005/0040935 | A1 | 2/2005 | Ewert et al. |
| 2007/0272144 | A1 | 11/2007 | Tomassetti et al. |
| 2008/0084282 | A1 | 4/2008 | Solow |
| 2008/0258883 | A1 | 10/2008 | Solow |
| 2011/0017149 | A1 | 1/2011 | Muschenski et al. |

\* cited by examiner

ELECTROMECHANICAL HORN FOR DETERRING ANIMALS

CROSS REFERENCE TO RELATED APPLICATION

This application is a Continuation-In-Part of and claims priority of U.S. patent application Ser. No. 13/548,185, filed on Jul. 12, 2012.

BACKGROUND OF THE INVENTION

1. Field of the Invention

This invention relates generally to sound devices that are used to disperse or deter animals and, more particularly, to an electromechanical horn device that produces a very loud audible sound in a frequency range in the region of greatest hearing sensitivity of a particular animal species, such as canines, and at a decibel level and pattern specially calculated to effectively disperse or deter an aggressive animal in a non-detrimental manner.

2. Background Art

In the following discussion, for purposes of understanding, the following terms related to sound are given the ordinary and customary meanings attributed to them by those of ordinary skill in the art. "Frequency" refers to the "pitch" of a sound measured in Hertz (Hz) or Kilohertz (kHz). A Hertz is a unit of frequency equal to one cycle per second. Higher frequency=higher pitched sound. "Hearing range" describes the range of frequencies that can be heard by an animal or human, though it can also refer to the range of levels.

Another important aspect of sound is the loudness or intensity of the sound. "Sound Pressure Level" (SPL) correlates to the "loudness" of sound measured in decibels (dB). A "decibel" (dB) is a unit used to measure the sound energy relative to a reference level. An increase of ten decibels in the power of a signal is equivalent to increasing its power by a factor of ten, and the perceived loudness by a factor of two (doubling perceived loudness). Zero decibels is defined as the average human threshold of hearing at 1 kHz. Generally speaking, higher sound pressure correlates with louder sound. The more distant the receiver of the sound is from the sound source, the lower the perceived sound level, thus, sound pressure level (SPL) specifications are typically expressed with regard to the distance (usually in meters) from the sound source and how loud the sound pressure level should be at that distance. Some breeds of dogs respond to a much lower intensity of sound than the average human. Dogs can also hear a broader range of frequencies, some at lower decibel levels than humans.

A pitched sound consists of a number of frequency components arranged in integer multiples of the "fundamental" frequency. These components are called harmonics and are numbered according to the corresponding integer multiple. Thus, the fundamental is the first harmonic. The second harmonic has twice the frequency, and the third harmonic three times the frequency of the fundamental, and so on.

The term "audible sound", as used herein, refers to sound which can be perceived by the human ear. In humans the audible frequency range is about 20 Hz to 20,000 Hz (20 kHz), with the frequency range of 3 kHz to 4 kHz (3,000 Hz to 4,000 Hz) being the most sensitive range.

In dogs the "audible" frequency range which can be perceived is about 40 Hz to 60,000 Hz (60 kHz), which is a much greater range than that of humans, with the frequency range of about 4 kHz to 10 kHz (4,000 Hz to 10,000 Hz) being the most sensitive range (i.e. the frequencies that can be detected at the lowest intensities), depending upon the breed and age. Studies by audiology researchers suggest that dogs hear little above 30 kHz (30,000 Hz).

The term "ultrasonic" sound, as used herein, refers to anything above the frequencies of audible sound, and nominally includes anything over 20 kHz (20,000 Hz). Most "silent" dog whistles and bark controllers produce "ultrasonic" sounds at frequencies higher than those audible to humans.

Situations often occur wherein individuals, or groups of individuals, may find themselves confronted by at least one dog. These situations tend to necessitate fleeing from the animal, scaring the animal off, or some other defense tactic. Unfortunately, the individual or individuals may become hurt in attempting to flee or discourage the animal. The animal may charge or attack the individuals and/or chase them causing further stress to the individuals and increasing the chances for injuries to both the individuals and the animals.

There are several commercially available products marketed for deterring canines such as the DAZER™ and DAZER II™, manufactured by Dazer International, Peterborough, England and distributed by K-II Enterprises of Syracuse, N.Y., emit high frequency "ultrasonic" sound bursts of 25 kHz (25,000 Hz) at a decibel level of 115 dB (SPL) at 0.5 meter reference. The DAZER™ devices are advertised as having an effective range of about 15 feet and increasing effectiveness as the dog becomes closer to the sound source.

Most "ultrasonic" products provide high frequency "ultrasonic" sound burst intended to produce a startle effect to interrupt a dog's barking or the dog's unwanted attention, and their ability to deter depends upon the dog's reaction to the strange sound. However, such devices are not effective on all dogs. For example, the dog's reaction depends upon its age, breed, mental state, temperament, health and intelligence. For instance, smaller dogs react better to "ultrasonic" noise, whereas medium to large sized dogs are more responsive to "audible" blasts of sound.

A typical "ultrasonic" sound burst produced by most ultrasonic products is in the frequency range starting at about 20 kHz (20,000 Hz), which is outside the most sensitive region of a dog's hearing (between 4 kHz and 10 kHz), but is at a decibel level to be detected by some dog breeds at close range. Another problem with an "ultrasonic" product marketed to deter canines is that the ultrasonic frequency does not disperse well as "beam angle" decreases as frequency increases, thus, the result can also depend upon how precisely the user aims the sound emitting device.

The more distant a receiver of the sound (the dog) is from the sound source, the lower the perceived sound level (dB). For example, the perceived sound level (dB) of an "ultrasonic" product which has a decibel level of 115 dB (SPL) at 0.5 meters (approximately equal to 1 foot 7½ inches) would be much less at a distance of about 15 feet. Moreover, the sound pressure level (dB) is only one component of the sound. An "ultrasonic" product emits "ultrasonic" sound bursts in a frequency of 25 kHz (25,000 Hz) which falls in a region of relatively low sensitivity canine hearing, well outside the region of greatest sensitivity.

Some air horns or aerosol horns are also marketed to deter canines. Air horns produce sound bursts in the "audible"

frequency range, and operate on a different principle from electromechanical horns. The air horn produces sound by discharging a gas at high velocity from a gas canister through a small orifice near the base of the horn. The gas jet contains broadband energy (i.e., at many acoustical frequencies). A flexible membrane, which traps a small volume of air, acts as a resonator or reed that concentrates the energy at the "natural" frequency of its lowest vibration mode.

As an example, Falcon Safety Products Inc., of Branchburg, N.J., produces a line of air horns having "audible" frequency ranges of from about 70 to 700 Hz, at 112 dB to 120 dB (SPL) at 10 feet.

As discussed above, the more distant a receiver of the sound (the dog) is from the sound source, the lower the perceived sound level (dB). For example, the perceived sound level (dB) of an "audible" air horn device which has a decibel level of 112 dB to 120 dB (SPL) at 10 feet (approximately equal to 3.048 meters) would be greater at a distance of 1 meter. However, the sound pressure level (dB) is only one component of the sound. "Audible" sound blasts emitted by an air horn deterrent device in the frequency range of 70 Hz to 700 Hz also fall into a region of relatively low sensitivity canine hearing, outside the region of greatest sensitivity.

Another major problem with many air horns is that the pressure of the gas and thus the sound output is inversely proportional to the temperature of the gas. Thus, on hot days, the pressure of the gas passing through the small orifice would be greater and could even freeze or cause ice to build up at the orifice as the gas expands through the orifice; and on very cold days, the pressure of the gas passing through the small orifice would be significantly reduced and may not produce any sound at all.

Another major problem with many air horns is that the product needs to be held in the correct position for it to function properly. In compressed gas products the gas inside the canister exists in two phases. One portion is in the gas phase while the other, due to pressure in the canister, exists in a liquid state. If the gas is not released while being used due to the user tilting or turning the canister it can fail. Movement and shaking of the canister also changes the gas to liquid ratio in the canister causing an increase in the liquid portion.

Mushenski et al, U.S. Published Application 2011/0017149, discloses an animal behavioral control apparatus that includes a cartridge, a housing, a head, and an extension assembly. The cartridge contains pressurized gas. The housing surrounds a part or more of the cartridge. The head is connected to the housing and includes an actuator and a valve. The valve engages the cartridge when the actuator is actuated in order to release gas out of the cartridge. The extension assembly is connected to the head to receive gas from the head. Upon actuation of the head, gas flows through the extension assembly and the animal behavioral control apparatus ejects a blast of gas which can be directed at an animal.

There are several patents that disclose electronic sound devices designed to disperse or deter various animals. The following are several examples.

Evans, U.S. Pat. No. 3,058,103, discloses a device for chasing pests such as rodents and bugs including flies and mosquitoes. The device generates an ultrasonic alternating signal having a frequency in a range having the lower limit of the range above that discernible by a human being and having the upper limit of the range lying between 20 kHz and 35 kHz. The generated alternating signal is then preferably constantly varied between these limits. The generated signal is then amplified sufficiently to drive a transducer or speaker to produce a sound which is inaudible to the human ear (above 20 kHz). The speaker may also be alternately turned on and off in combination with the varying of the frequency referred to which rodents are incapable of withstanding, and as a result, they leave the area. In the case of bugs, such as flies and mosquitoes, the frequency is preferably varied in a range which extends from the upper range (20 Hz-35 kHz) to an upper range lying in the order of 200 kHz.

Stewart, U.S. Pat. No. 3,683,113, discloses a synthetic animal sound generator and method for ridding an area of pest birds by generating signals that correspond to warning or alarm signals normally created by the birds themselves. The apparatus generates a carrier signal in a frequency range of about 500 Hz to about 5,000 Hz. The carrier signal is modulated by a lower frequency AC signal in the range of about 50 to 300 Hz to form a composite signal which is intermittently silenced to generate a plurality of signal pulses. The modulated carrier signal is intermittently interrupted at a rate of at least about once per second to produce a chirping sound, and an electro-acoustic transducer converts the modulated and intermittently interrupted carrier signal to a sound signal which is directed at the pest birds.

Beuter et al, U.S. Pat. No. 4,769,794, discloses a bird-scaring method and device wherein at least two acoustic signals are generated whose frequencies are periodically modulated within a range between about 30 Hz and 9,000 Hz, the modulation period ranging between about 0.01 and about 5 seconds. The signals differ in the frequency modulation range, in the modulation period and/or in duration, and may be emitted either in fixed or in arbitrary sequence. The interval between the individual signals can be between 20 seconds and 1 hour, preferably between 1 and 30 minutes, in particular between 5 and 20 minutes. Each of the signals are frequency-modulated preferably between 100 Hz and 7,000 Hz, in particular between 150 Hz and 5,000 Hz. The modulation period ranges between about 0.01 and 5 seconds, preferably between 0.02 and 2 seconds, in particular between 0.05 and 1 second. Particularly favorable results are obtained if the range in which frequency modulation occurs covers at least 2,000 Hz. The lower limit of the frequency modulation range should preferably be, however, between 1,000 Hz and 100 Hz, in particular between 500 Hz and 100 Hz. The duration of each individual signal is between 1 and 30 seconds, preferably between 10 and 20 seconds. Due to the measure according to the invention, a sound pressure level of about 60 dB at the place of sound emission is sufficient.

Janis, U.S. Pat. No. 5,196,829, discloses a personal safety device controlled by a microprocessor which responds to commands, such as activation and deactivation commands. The microprocessor acts to control sound emitted from two separate speakers. The sound is controlled through digital outputs of the microprocessor such that the sound emitted by the first speaker has a first sinusoidal component sin (a) and the sound emitted by the second speaker has a second sinusoidal component sin (b) yielding a complex tone when perceived by a human ear. The personal safety device further allows for coded deactivation thereby rendering it difficult for a third-party without knowledge of the code, such as a would-be attacker, to deactivate the device, and has a detection circuit for detecting a low battery condition.

Carlo et al, U.S. Pat. No. 5,278,537, discloses an electronic vehicle mounted alarm for avoiding collision with animals in a non-destructive manner, which generates ultrasonic sound for preventing animals from moving into the path of the vehicle. The device generates electrical impulses in the form of square waves having constant peak-to-peak voltages with periodic, sequentially increasing wave frequencies followed by sequentially decreasing wave frequencies. A coupling transformer converts the square waves into electrical sine wave voltages having high peak-to-peak voltages to cause a piezo-electric transducer to emit intense, ultrasonic sounds of periodically increasing frequencies in a range from 19 kHz to 30 kHz (19,000 Hz to 30,000 Hz) followed by periodically decreasing frequencies simulating the warble effect of a siren. A preferred frequency pattern commences at 21 kHz (21,000 Hz) and continues until 24 kHz (24,000 Hz) immediately followed by a decrease in sequence from 24 kHz to 21 kHz. The ultrasonic warble effect confuses the animal to prevent inadvertent movement by the animal into the oncoming vehicle's path without injury to the animal.

Canfield, U.S. Pat. No. 6,677,853, discloses an animal deterrent system using the vehicle horn to deter auto collisions with animals, and more specifically to allow the standard automobile horn to be altered in a manner such that the noise alerts animals, particularly deer, to the presence of an approaching vehicle. A timer/oscillator is selectively connected between the vehicle horn actuator (e.g., the button on the steering wheel of the vehicle) and the vehicle horn. When the timer is connected between the horn actuator and the horn, a continuous input to the horn actuator is converted to an intermittent horn output (preferably cycling between 2 Hz and 20 Hz), with the intermittent horn output synchronized with the timer pulses.

Ewert et al, U.S. Pat. No. 7,042,340, discloses a vehicle mounted animal alerting device that produces a sound that stimulates an alertness response in large animals, such as a deer, to reduce the likelihood that the animals will run into a roadway and cause an animal-vehicle crash. The sound produced by the device is a random intermittent sound pattern in an audible frequency range (in the same general range that humans can hear). More specifically, an animal alerting device in accord with a preferred Ewert et al embodiment produces sounds generally in the range of 1-10 kHz (1,000 to 10,000 Hz) and, more specifically, in the range of 1-5 kHz (1,000 to 5,000 Hz). The volume of the sound produced is automatically adjusted for vehicle speed. For example, in a vehicle traveling at highway speed the sound is amplified to a relatively high level, e.g., approximately 80 dB or more. Different sound patterns may be produced automatically based on different geographical locations of the vehicle in which the device is mounted.

Perlo et al, U.S. Pat. No. 7,098,775, discloses a system and method for avoiding the collision of a vehicle with animals tending to cross the road before the moving vehicle. The system comprises a visual system directly actuating one or more RF emitters, emitting directional ultrasonic sound waves with a frequency above 25,000 Hz (25 kHz), the range above that discernible by a human being. The sound waves are directed frontally though with a frequency decreasing from the center of the roadway towards the road edge, so as to lead the animal to move towards the road edge.

DeWitt et al, U.S. Pat. No. 8,737,169, discloses a dog repelling device that includes a battery-powered timer-controlled ultrasonic pulse emitter disposed within a housing and includes a fastener for attaching the housing to a bicycle handlebar. In a preferred embodiment of the fastener is a hook and loop strip that inserts through a slot in the housing and has first and second ends that are releasably fastened together to attach the housing to the handlebar.

There are also several patents that disclose electronic sound devices designed to train animals, such as canines. For example, Duncan et al, U.S. Pat. No. 6,750,758, discloses a collar-mounted remotely controlled beeper training device which includes a piezoelectric transducer device mounted in a transducer housing configured as a resonant sound port. The piezoelectric transducer is driven by circuitry including a microcontroller, a voltage booster circuit, and driver circuitry coupled to the booster circuit producing a boosted drive signal to the piezoelectric device. The microcontroller stores data representing a plurality of sequential segments each having a start and stop time and a start and stop frequency representative of an animal sound, such as a hawk scream, and a program executed by the microcontroller sequentially produces a plurality of output signals having a start and stop times and frequencies in response to the stored data so as to accurately reproduce the animal sounds.

There are also several patents that disclose electronic sound devices designed to "attract" animals, rather than disperse or deter them, and other uses.

Solow, U.S. Published Patent Applications 2008/0258883 (abandoned) and 2008/0084282 (now U.S. Pat. No. 8,004,390) disclose a an electro-mechanical horn device having a body, a sound-generating unit mounted in the body, and plural compartments for storing at least one removably mounted battery and a second battery in an operative manner thereby enabling enhanced battery storage and limiting discontinuity of the operation of the sound-generating unit. The sound-generating unit includes an oscillator that provides a series of pulses to an electromagnet speaker having a coil electromagnet and diaphragm. A CPU controller containing pre-recorded digital sounds reproduces previously recorded signals, such as animal sounds, warning signals, etc. The frequency of the sound may be selectively adjusted to generate the sound of a chosen animal. For example, sound signals at a frequency and pitch generally similar to those made by a wild turkey, so as to attract another turkey. The pitch of the horn is determined by the flexibility of the diaphragm; its physical size; the power of the electromagnet; the mass of the diaphragm, and a number of other contributing factors. The pulses have a repetition rate substantially less than the natural frequency (3,000 Hz) of the diaphragm. The horn may be used for sports activity (hunting), sporting events, and emergency rescue operations.

SUMMARY OF THE INVENTION

The present invention overcomes the aforementioned problems and is distinguished over the prior art in general, and these patents in particular by an electromechanical horn device having a generally L-shaped housing with a longer generally rectangular lower portion and a shorter generally rectangular upper portion extending outwardly from the back side of the lower portion. The lower portion is sized and shaped to be held in the palm (palmar side) of a hand of a user. An adjustable hand strap is mounted on the back side of the lower portion and configured to form a loop that can be either grasped by the palm (palmar side) of the hand of the user, or to extend over the back (dorsal side) the hand of the user holding said lower portion. A piezoelectric speaker is mounted in the interior of the lower portion and its front end is positioned in an opening in the front wall of the lower portion. A battery, and a printed circuit board containing a microcontroller are mounted in the interior of the housing above the piezoelectric speaker. A low battery indicator light is mounted at the upper end of the housing, and a depressible thumb button extends through and opening at the back end of the upper portion for receiving the thumb of the user.

When activated, the horn device produces a very loud audible sound in a frequency range in the region of greatest hearing sensitivity of a particular animal species, such as canines, and at a decibel level and sound pattern specially calculated to effectively disperse or deter an aggressive animal in a non-detrimental manner. More particularly, the piezoelectric speaker generates a series of short, audible sound signals in a repetitive pattern, each generated signal having a fundamental frequency with associated harmonics, a decibel level, and duration determined by the microcontroller program. The microcontroller may be programmed to cause the piezoelectric speaker to emit a series of short, audible sound signals of different fundamental frequencies in a repetitive alternating pattern. Alternatively, the microcontroller may be programmed to cause the piezoelectric speaker to emit a series of short, "one-tone" audible sound signals of the same fundamental frequency in a repetitive pattern.

The generated audible sound signals have fundamental frequencies with associated harmonic component frequencies that fall within a frequency range of greatest hearing sensitivity and at decibel levels that can be detected at the lowest intensities at which dogs of a variety of breeds and ages will respond, thereby providing a very effective device to disperse or deter an aggressive canine in a non-detrimental manner.

One of the significant features and advantages of the present invention is that it produces audible sound signals in a frequency range in the region of greatest hearing sensitivity of a particular animal species, such as canines.

Another significant feature and advantage of this invention is that it produces audible sound signals in a frequency range in the region of greatest hearing sensitivity of a particular animal species, and at a decibel level and pattern specially calculated to effectively disperse or deter an aggressive animal, such as a canine, in a non-detrimental manner.

Another significant feature and advantage of this invention is that it produces a series of short, audible sound signals in a repetitive pattern, each generated signal having a fundamental frequency with associated harmonics in a frequency range, and at decibel levels in the region of greatest hearing sensitivity of dogs and at which of a variety of breeds and ages will respond.

Another significant feature and advantage of this invention is that it produces a series of short, audible sound signals of different fundamental frequencies in a repetitive alternating pattern with associated harmonics in a frequency range, and at decibel levels in the region of greatest hearing sensitivity of dogs and at which of a variety of breeds and ages will respond.

Another significant feature and advantage of this invention is that may produce a series of short, one-tone audible sound signals of the same fundamental frequency in a repetitive pattern with associated harmonics in a frequency range, and at decibel levels in the region of greatest hearing sensitivity of dogs and at which of a variety of breeds and ages will respond.

Another feature and advantage of this invention is that the horn device utilizes a piezoelectric speaker for generating the high intensity of the sound which is small in size, consumes less electric power than conventional magnetic coil and diaphragm speakers, and more reliably reproduces a range of sound frequencies.

Another feature and advantage of this invention is that the hand strap can be either grasped by the palm (palmar side) of the hand of the user in the manner of a handle, or may extend over the back (dorsal side) the hand of the user holding the lower portion of the housing, and in either situation, the thumb button can be easily depressed by the user's thumb.

Another feature and advantage of this invention is that the horn device may be easily positioned or aimed and actuated to focus the high intensity audible sound toward the aggressive animal such that the brunt of the sound is experienced by the animal.

A still further feature and advantage of this invention is that the horn device is simple in construction, inexpensive to manufacture, and rugged and reliable in operation.

Other features and advantages of the invention will become apparent from time to time throughout the specification and claims as hereinafter related.

DESCRIPTION OF THE PREFERRED EMBODIMENT

Figure 1:
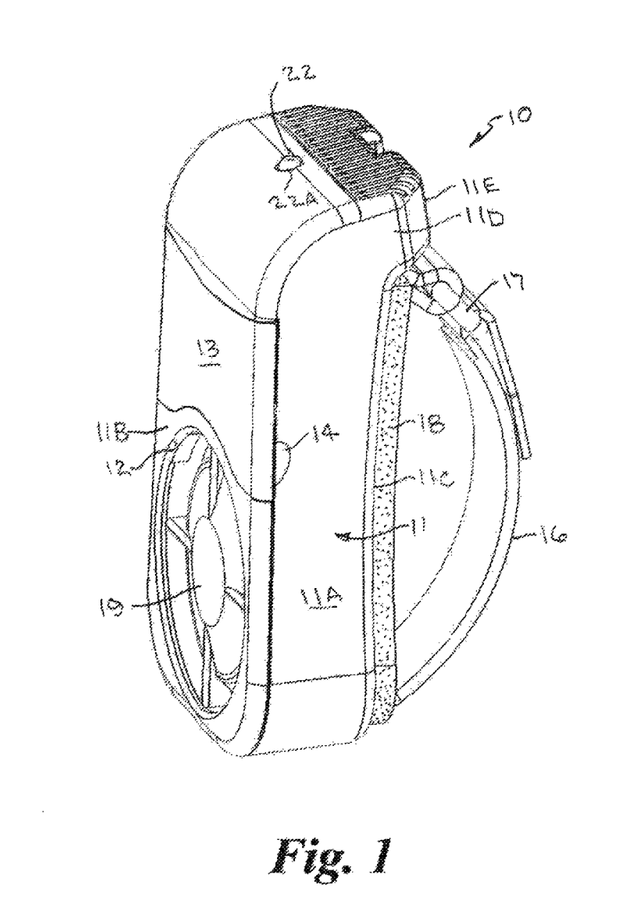
FIG. 1 is a perspective view of the electromechanical horn device in accordance with the present invention, shown from the front, top, and one side.
Figure 2:
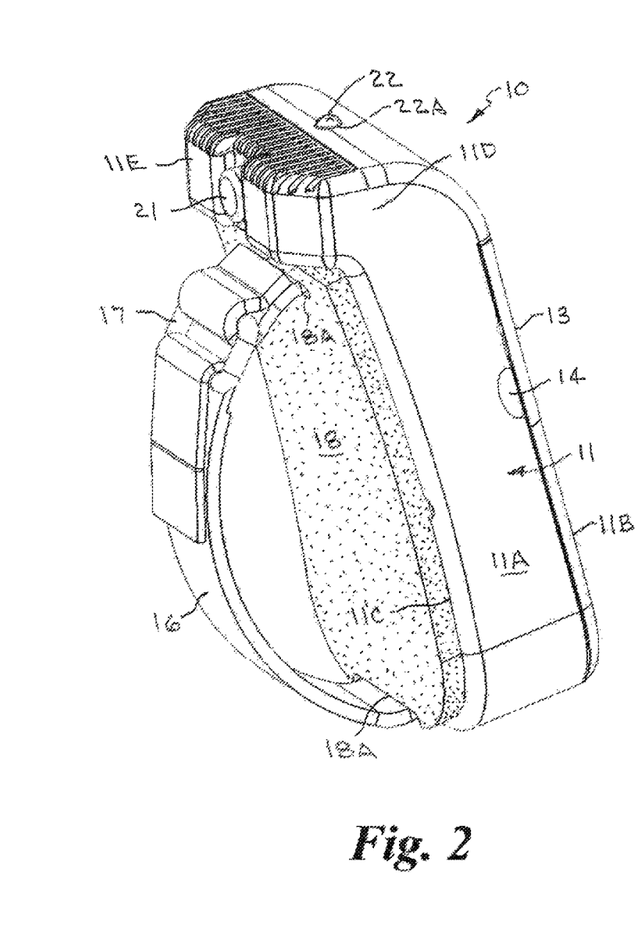
FIG. 2 is a perspective view of the electromechanical horn device shown from the back, top, and side opposite that shown in FIG. 1.
Figure 3:
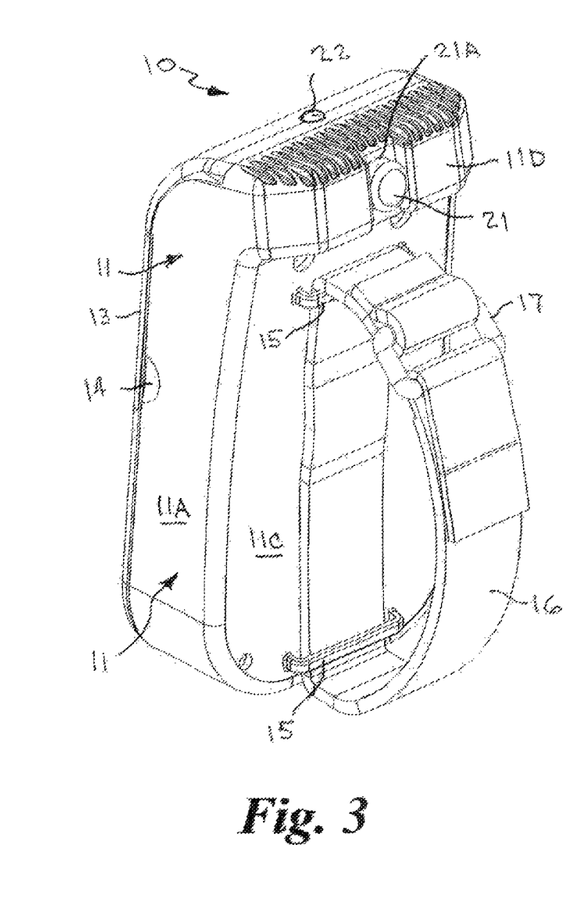
FIG. 3 is a perspective view of the electromechanical horn device shown from the back, top, and side, shown with the cushioning pad removed to illustrate the hand strap mounting arrangement.

Referring to the drawings by numerals of reference, there is shown in FIGS. 1-3, an electromechanical horn device 10 in accordance with a preferred embodiment of the present invention. In the following discussion, the terms, such as top, bottom, upper, lower, inward, outward, downward, above, and below are used to describe the orientation of the horn components as depicted with the device positioned as shown in the drawings.

In the following discussion, for purposes of understanding, the following terms related to the hand of a user are given the ordinary and customary anatomical meanings attributed to them by those of ordinary skill in the art. The front, or palm-side, of the hand is referred to as the "palmar side", and the back of the hand is called the "dorsal side".

The horn 10 includes a generally inverted L-shaped housing 11 formed with a longer, generally rectangular lower portion 11A having a front side 11B, a back side 11C, and a shorter generally rectangular upper portion 11D extending rearwardly outwardly from the upper end of the back side of the lower portion terminating in a back end 11E. The lower portion 11A of the housing is sized and shaped to be held in the palm (palmar side) of a hand of a user.

The front wall of the front side 11B of the lower portion 11A is provided with a circular hole 12 for receiving a speaker 19 (described hereinafter) mounted in the interior of the lower portion. The front side 11B of the lower portion 11A is also provided with a removable battery compartment cover plate 13 that snap fits over an opening in the front wall to cover a battery B (described hereinafter) removably mounted in the interior of the lower portion. The opposed side walls of the lower portion 11A of the housing 11 are provided with semi-circular depressions 14 adjacent to the respective lateral sides of the cover plate 13 to facilitate manually gripping and removing and replacing the cover plate.

A depressible thumb button 21 (described hereinafter) extends through an aperture 21A at the back end 11E of the shorter generally rectangular upper portion 11D. A low battery indication light 22 (described hereinafter) extends through an aperture 22A at the top end of the shorter generally rectangular upper portion 11D.

As best seen in FIG. 3, a pair of thin U-shaped loop brackets 15 are mounted on the back side 11C of the lower portion 11A of the housing in horizontal vertically spaced parallel relation such that their horizontal portions are spaced a short distance outwardly from the backside 11C of the lower portion. An adjustable hand strap 16 formed of a length of hook and loop fastener webbing material is mounted on the back side 11C of the lower portion 11A.

One end of the hand strap 16 is attached to a first side of a plastic or metal loop member 17, and the opposed free end is fed through the vertically spaced U-shaped loop brackets 15 on the back side 11C of the lower portion 11A of the housing, and then through the opposed second side of the plastic or metal loop member 17.

Referring again to FIGS. 1 and 2, a generally rectangular cushioning pad 18 formed of resilient foam material is adhesively adhered to the back side 11C of the lower portion 11A of the housing and over the mid portion of the hand strap to secure the hand strap to the back side of the housing. The cushioning pad 18 has cutout portions 18A to accommodate the vertically spaced U-shaped loop brackets 15. Alternatively, the generally rectangular cushioning pad 18 may be adhesively adhered to the back side 11C of the lower portion 11A of the housing prior to feeding the hand strap 16 through the loop brackets 15, such that the mid portion of the hand strap resides on the outer facing side of the cushioning pad.

The hand strap 16 may be formed into an adjustable loop by feeding its free end through the opposed second side of the plastic or metal loop member 17, and securing it onto itself by engaging the mating hoop and loop fastener elements. The looped hand strap 16 can be either grasped by the palm (palmar side) of the hand of the user in the manner of a handle, or may extend over the back (dorsal side) the hand of the user holding the lower portion 11A of the housing 11. In either situation, the thumb button 21 (described hereinafter) can be easily depressed by the user's thumb.

Figure 4:
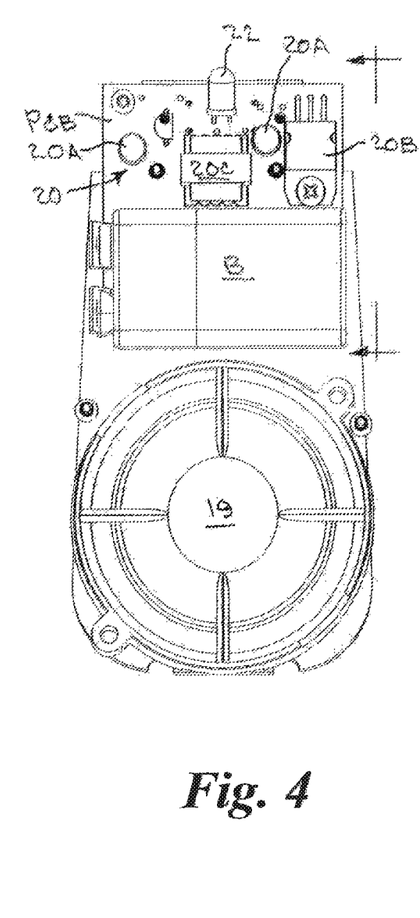
FIG. 4 is a front elevation view of the speaker, printed circuit board, and electronic components that are mounted in the interior of the housing.
Figure 5:
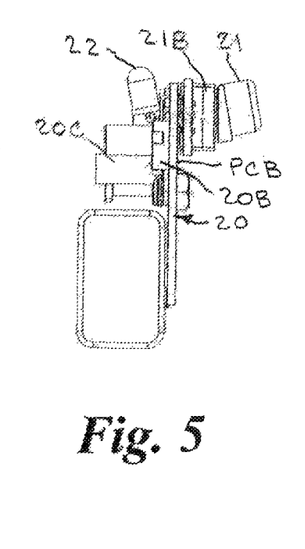
FIG. 5 is a side elevation view, taken along lines 5-5 of FIG. 4, showing the printed circuit board, thumb button, low battery indication light, and associated electronic components.

Referring now additionally to FIGS. 4 and 5, the electronic components that are mounted in the housing are shown. As described briefly above, a piezoelectric speaker 19 is mounted in the interior of the lower portion 11A of the housing 11 and its front end is positioned in the circular hole 12 in the front side 11B of the lower portion (FIG. 1).

A conventional battery holder, and a printed circuit board PCB containing a microcontroller circuit 20 and related components is mounted in the interior of the housing 11 above the piezoelectric speaker 19. As used herein, the term "microcontroller" refers to any control device or circuit including controllers, microcontrollers, processors, microprocessors, digital signal processors, programmable logic arrays, or discrete logic circuits, which provide processing, and/or control capability for implementing the functions described herein. In the illustrated example, capacitors 20A, transistors 20B, and a transformer 20C, are soldered onto the printed circuit board PCB, and other components may be embedded in the substrate. The piezoelectric speaker 19 operatively connected with the transformer 20C which is driven by the microcontroller circuitry 20 and network of capacitors 20A, and transistors 20B. A battery B, such as a conventional 9-volt DC battery, is removably mounted in the battery holder.

It should be understood that other types of speakers may be used, however, the piezoelectric speaker 19 is preferred because it is small in size, consumes less electric power, and generates sound by the vibration of a thin piezo ceramic plate attached to a diaphragm film and utilizes the piezoelectric vibration of the ceramic plate itself, rather than generating sound with vibration of a diaphragm using the electromagnetic force of a magnet and a coil.

A depressible thumb button 21 coupled with a push-button activation switch 21B on the back side of the printed circuit board PCB (FIG. 5) extends through the aperture 21A at the back end 11E of the shorter generally rectangular upper portion 11D of the housing (FIGS. 2 and 3) for receiving the thumb of a user's hand holding the lower portion 11A of housing 11 or gripping the hand strap 16 in the manner of a handle.

A low-battery indication light 22, such as an LED, is mounted on the printed circuit board PCB and operatively coupled with the battery B through electrical circuitry of the printed circuit board and extends through the 22A aperture at the top end of the shorter generally rectangular upper portion 11D of the housing 11 (FIGS. 1, 2, and 3), and becomes illuminated to indicate a low-battery condition.

The wiring and electrical circuitry details of the components are conventional and readily understood by those skilled in the art and therefore are not shown or described in detail. The terminals of the battery B are connected with the circuitry of the printed circuit board PCB by a conventional battery connector, and wire leads or imbedded circuits extend between the battery B, the activation switch 21B, the printed circuit board PCB, the microcontroller circuitry 20, and the piezoelectric speaker 19, to supply power controlled by the activation switch, to operate the sound generating system.

The sound producing system is activated by a user depressing the thumb button 21 which moves the activation switch 21B to the ON position to supply power to the microcontroller circuitry 20, which is programmed to produce drive signals causing the piezoelectric speaker 19 to emit a predetermined sound (described hereinafter). The microcontroller circuitry 20 may include oscillator/driver circuitry, and voltage booster circuitry for producing boosted sound signals to the piezoelectric speaker 19. The microcontroller circuitry 20 has an executable program stored in memory configured to produce signals in a repetitive sequential pattern, each having a frequency, decibel level, and duration determined by the program.

The piezoelectric speaker 19 emits a series of short, audible sound signals in a repetitive pattern, each generated signal having a fundamental frequency with associated harmonics, a decibel level, and duration determined by the program. The microcontroller circuitry 20 may be programmed to cause the piezoelectric speaker 19 to emit a series of short, audible sound signals of different fundamental frequencies in a repetitive alternating pattern. Alternatively, the microcontroller circuitry 20 may be programmed to cause the piezoelectric speaker 19 to emit a series of short, audible sound signals of the same fundamental frequency in a repetitive pattern.

In the following discussion, the term "generated signal" refers to the sound signal that is generated and emitted by the piezoelectric speaker and has a fundamental frequency, as distinguished from the harmonic component frequency of the fundamental frequency of the generated signal.

As used herein, the term "two-tone" signal pattern refers to a series of generated signals wherein a first generated sound signal having a fundamental frequency with a second harmonic component is followed by a second generated signal having a higher fundamental frequency with a second harmonic. As used herein, the term "one-tone" signal pattern refers to a series of generated signals, each having the same fundamental frequency with a second harmonic component.

Repetitive Two-Tone Signal Pattern

In a first example of a "two-tone" series of signals, a first generated sound signal may have a fundamental frequency in a range of from about 3 kHz to about 5 kHz (3,000 Hz to about 5,000 Hz), a decibel level in the range of from about 95 dB to about 115 dB (SPL) at 1 meter, and duration period in the range of from about 50 to 70 milliseconds. The second harmonic component of the fundamental frequency of the first generated sound signal is in the range of from about 6 kHz to about 10 kHz (6,000 Hz to about 10,000 Hz) and has a decibel level in the range of from about 75 dB to about 95 dB (SPL) at 1 meter. The first generated sound signal is followed by a second generated signal having a fundamental frequency in the range of from about 6 kHz to about 10 kHz (6,000 Hz to about 10,000 Hz) and has a decibel level in the range of from about 75 dB to about 95 dB (SPL) at 1 meter. Thus, in this example, the range of the fundamental frequency of the second generated sound signal is in the same range as the second harmonic component of the fundamental frequency of the first generated sound signal.

In a second example of a "two-tone" series of signals, the first generated sound signal may have a fundamental frequency of about 4 kHz, a decibel level of about 95 dB to about 115 dB (SPL) at 1 meter, a duration period of about 65 milliseconds. The second harmonic component of the fundamental frequency of the first generated sound signal is about 8 kHz, and has a decibel level in the range of from about 75 dB to about 95 dB (SPL) at 1 meter. The first generated sound signal is followed by a second generated sound signal which may have a fundamental frequency of about 4.5 kHz, a decibel level of about 95 dB to about 115 dB (SPL) at 1 meter, a duration period of about 65 milliseconds, and a second harmonic component of about 9 kHz with a decibel level in the range of from about 75 dB to about 95 dB (SPL) at 1 meter Thus, in this example, the first generated signal and the second generated signal each have a second harmonic component of about 8 kHz and 9 kHz, respectively.

Repetitive One-Tone Signal Pattern

In a first example of a "one-tone" series of signals, each generated sound signal may have a fundamental frequency in a range of from about 3 kHz to about 5 kHz (3,000 Hz to about 5,000 Hz), a decibel level in the range of from about 95 dB to about 115 dB (SPL) at 1 meter, and duration period in the range of from about 50 to 70 milliseconds. The second harmonic component of the fundamental frequency of each generated signal is in the range of from about 6 kHz to about 10 kHz (6,000 Hz to about 10,000 Hz) and has a decibel level in the range of from about 75 dB to about 95 dB (SPL) at 1 meter.

In a second example of a "one-tone" series of signals each generated sound signal may have a fundamental frequency of about 4 kHz to about 4.5 kHz, a decibel level in the range of from about 95 dB to about 115 dB (SPL) at 1 meter, and a duration period of about 65 milliseconds; and the second harmonic component of the fundamental frequency of each generated signal is in the range of from about 8 kHz to about 9 kHz, and has decibel level in the range of from about 75 dB to about 95 dB (SPL) at 1 meter.

The values discussed above have been found to be particularly effective in dispersing or deterring an aggressive canine, and in the following discussion, the canine species is used for purposes of example only, and not limited thereto. It should be understood that the present device may be used for dispersing or deterring animals of other species.

Figure 6:
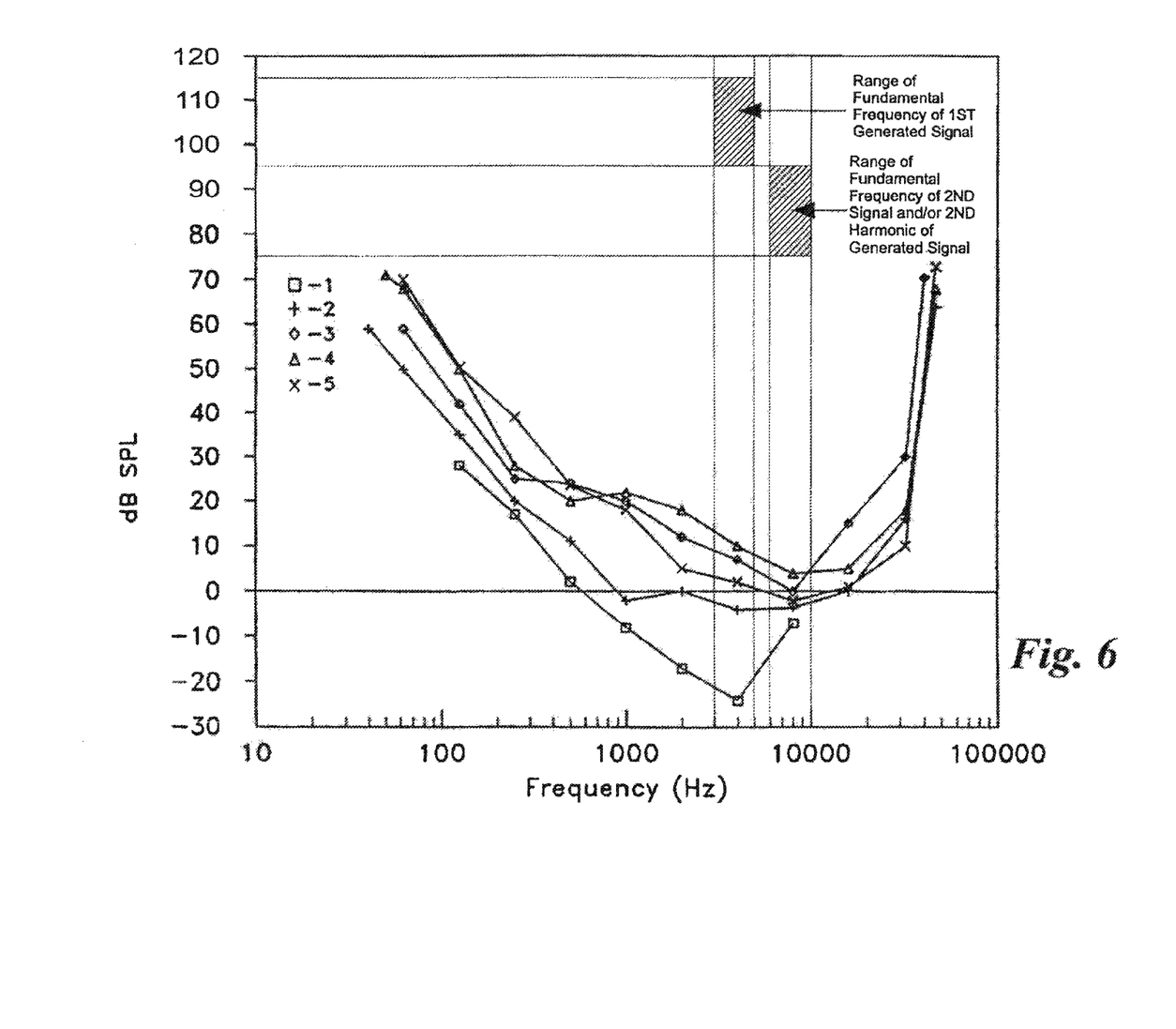
FIG. 6 is an audiogram illustrating the range of hearing sensitivity from a book compiling thousands of published references into a single source and the frequency range and decibel level of the first and second output sound signals produced by the present electromechanical horn device in accordance with the present invention.

Referring now to FIG. 6 there is shown an audiogram illustrating the hearing sensitivity of dogs from a book compiling thousands of published references into a single source (RR Fay, 1988, *Hearing in Vertebrates: a Psychophysics Databook*. Hill-Fay Associates, Winnetka Ill.). The audiogram compiles data on the dog from two published sources: one reporting an average from 11 dogs of unspecified breeds (EA Lipman & JR Grassi, 1942, *Comparative auditory sensitivity of man and dog*. Amer J Psychol 55:84-89); and one reporting results from single dogs of four breeds (HE Heffner, 1983, *Hearing in large and small dogs: Absolute thresholds and size of the tympanic membrane*, Behav Neurosci 97:310-318). Frequency is displayed on a logarithmic scale from 10 Hz to 100,000 Hz (100 kHz).

The audiogram of FIG. 6 expands the stimulus intensity range (in dB sound pressure level) of the original RR Fay audiogram to encompass the higher dB range of the present invention. The legend corresponding to the audiogram is presented in Table 1, below.

TABLE 1

| | Legend |
|---|---|
| □-1 | Curve 1 = average from 11 dogs of unspecified breeds (Lipman & Grassi, 1942) |
| +-2 | Curve 2 = Poodle (Heffner, 1983) |
| ◇-3 | Curve 3 = Dachshund (Heffner, 1983) |
| ▵-4 | Curve 4 = Saint Bernard (Heffner, 1983) |
| X-5 | Curve 5 = Chihuahua (Heffner, 1983) |

George M. Strain, Professor of Neuroscience at the Comparative Biomedical Sciences School of Veterinary Medicine of Louisiana State University in Baton Rouge, La. published a paper titled *How Well Do Dogs and Other Animals Hear?* discussing the RR Fay, 1988, audiogram and reported that it can be seen that the lowest intensity detected differs between the two studies; and the professor placed greater reliance on the Heffner study because it is more current, and because Heffner is a widely published and respected audiology researcher. It can be seen in the audiogram of FIG. 6 that the greatest sensitivity (i.e. the frequencies that can be detected at the lowest intensities) is in the frequency range of 4 kHz to 10 kHz (4,000 Hz to 10,000 Hz).

The range of signal values of the first examples of the "two-tone" and "one-tone" signal patterns discussed above are shown on the audiogram of FIG. 6 as shaded rectangles. It can be seen that the generated signals emitted by the present electromechanical horn device have a fundamental frequency in a range from about 3 kHz to about 5 kHz (3,000 Hz to about 5,000 Hz), a decibel level in the range of from about 95 dB to about 115 dB (SPL) at 1 meter. The second harmonic component of the fundamental frequency of the generated signals is in the range of from about 6 kHz to about 10 kHz (6,000 Hz to about 10,000 Hz) and has a decibel level in the range of from about 75 dB to about 95 dB (SPL) at 1 meter.

In the "two-tone" pattern, the first generated sound signal is followed by a second generated signal having a fundamental frequency in the range of from about 6 kHz to about 10 kHz (6,000 Hz to about 10,000 Hz) and a decibel level in the range of from about 75 dB to about 95 dB (SPL) at 1 meter.

In the second examples of the "two-tone" and "one-tone" series of signals, the first generated sound signal has a fundamental frequency of about 4 kHz, a decibel level of from about 95 dB to about 115 dB (SPL) at 1 meter, a duration period of about 65 milliseconds and a second harmonic component of the fundamental frequency of about 8 kHz, with decibel level in the range of from about 75 dB to about 95 dB (SPL) at 1 meter. The first generated sound signal is followed by a second generated sound signal having a fundamental frequency of about 4.5 kHz, a decibel level of about 95 dB to about 115 dB (SPL) at 1 meter, a duration period of about 65 milliseconds, and having a second harmonic component of about 9 kHz with a decibel level in the range of from about 75 dB to about 95 dB (SPL) at 1 meter. Thus, in the second examples, the first and second generated signals fall within the frequency range depicted in the upper shaded rectangle of FIG. 6, and the first generated signal and the second generated signal have a second harmonic component of about 8 kHz and 9 kHz, respectively, that fall within the range depicted in the lower shaded rectangle.

Thus, it should be understood from the foregoing, that the present electromechanical horn device produces audible sound signals at fundamental frequencies and associated second harmonic component frequencies in decibel levels in the most sensitive frequency range of a dog's hearing that can be detected at the lowest intensities at which dogs of a variety of breeds and ages will respond (4 kHz to 10 kHz), thereby providing a very effective device to disperse or deter an aggressive canine in a non-detrimental manner.

Although the high intensity sound produced by the horn is audible to humans; the horn may be positioned or aimed and actuated at a height proximate the dog to focus the sound toward the dog so that the brunt of the sound is experienced by the dog.

It should also be understood from the foregoing that the configuration of the present horn device allows it to be hand-held, carried and held in the palm of the hand or by gripping the hand strap when walking or jogging, or riding a bicycle, and quickly actuated by depressing the thumb button to direct the sound toward the canine. It may also be removably attached to a bicycle, scooter, motorcycle, baby stroller, or other conveyance or object by a clamp attachment accessory (not shown), which has a clamp member removably attached to the housing, and a pair of resilient laterally opposed curved arms configured to releasably engage a cylindrical or tubular portion of an object or conveyance such as a bicycle, scooter, motorcycle, baby stroller, or other conveyance, by means of the clamp attachment assembly, and for transporting the horn thereon.

Although, an aggressive canine, has been used for purposes of example in the discussions above, it should be understood that the present device may be used for dispersing or deterring animals of other species.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A portable manually operated electromechanical horn device for dispersing or deterring aggressive animals, comprising:

a housing having an inverted generally L-shaped configuration with a longer generally rectangular lower portion having a front side and a back side, and a shorter generally rectangular upper portion extending rearwardly from an upper end of said back side of said lower portion terminating in a back end, said lower portion adapted to be held in the palm of a hand of a user;

an adjustable hand strap mounted on said back side of said lower portion configured to form a loop extending outwardly therefrom adapted to be either grasped in the palm of the hand of the user in the manner of a handle, or to extend over the back side the hand of the user holding said lower portion in the palm of the hand;

a sound generating system in said housing including a piezoelectric speaker mounted in said lower portion having a front end positioned in an opening in a front wall thereof, and a printed circuit board containing microcontroller circuitry and related components mounted in said housing programmed to cause said piezoelectric speaker to generate a series of short, audible sound signals having fundamental frequencies with associated second harmonic component frequencies in a repetitive alternating signal pattern;

a battery mounted in said housing connected with said piezoelectric speaker and said microcontroller for supplying power thereto;

a low-battery indicator light on said housing operatively connected with said battery to become illuminated to indicate a low-battery condition; and a push button on said housing coupled with an on-off switch mounted within said housing and operatively connected between said electrical power source and said sound generating system to power said piezoelectric speaker and said microcontroller circuitry;

said push button mounted at said back end of said shorter generally rectangular upper portion in a position to be depressed by a thumb of the user while grasping said hand strap in the manner of a handle, or while holding said housing lower portion in the palm of their hand; wherein depression of said push button causes said piezoelectric speaker to emit said series of short audible sound signals in said repetitive alternating signal pattern having a decibel level in a range of from about 75 dB to 115 dB and having fundamental frequencies with associated second harmonic component frequencies that fall within a frequency range of from about 3 kHz to 10 kHz to effectively deter, scare, or repel an aggressive animal in a non-detrimental manner.

2. The portable manually operated electromechanical horn device according to claim 1, wherein
said microprocessor circuitry is programmed to cause said piezoelectric speaker to emit a series of short audible two-tone sound signals having two different fundamental frequencies in said repetitive alternating signal pattern, comprising:
a first generated sound signal having a decibel level in a range of from about 95 dB to 115 dB, a duration period of from about 50 to 70 milliseconds, and a fundamental frequency of about 3 kHz with an associated second harmonic component frequency of about 6 kHz, followed by;
a second generated sound signal having a lower decibel level in a range of from about 75 dB to 95 dB, a duration period of about 65 milliseconds, and a higher fundamental frequency of about 5 kHz, with an associated second harmonic component frequency of about 10 kHz; and wherein
said decibel levels and fundamental frequencies of said first and second generated audible sound signals and their respective said associated second harmonic frequencies in said repetitive alternating signal pattern are all within a frequency range of from about 3 kHz to 10 kHz to effectively deter, scare, or repel an aggressive animal in a non-detrimental manner.

3. The portable manually operated electromechanical horn device according to claim 2, wherein
said first generated sound signal has a decibel level in a range of from about 95 dB to 115 dB, a duration period of from about 50 to 70 milliseconds, and a fundamental frequency of about 4 kHz with an associated second harmonic component frequency of about 8 kHz; and
said second generated sound signal has a decibel level in a range of from about 95 dB to 115 dB, a duration period of about 65 milliseconds, and a higher fundamental frequency of about 4.5 kHz, with an associated second harmonic component frequency of about 9 kHz; and wherein
said decibel levels and fundamental frequencies of said first and second generated audible sound signals and their respective said associated second harmonic frequencies in said repetitive alternating signal pattern are all within a frequency range of from about 4 kHz to 9 kHz to effectively deter, scare, or repel an aggressive animal in a non-detrimental manner.

4. The portable manually operated electromechanical horn device according to claim 3, wherein
each said generated sound signal having a decibel level in a range of from about 95 dB to 115 dB, a duration period of from about 50 to 70 milliseconds, and a fundamental frequency in a range of from about 4 kHz to about 4.5 kHz with an associated second harmonic component frequency in a range of from about 8 kHz to about 9 kHz; and
said decibel levels and fundamental frequencies of said first and second generated audible sound signals and their respective said associated second harmonic frequencies in said repetitive alternating signal pattern are all within a frequency range of from about 4 kHz to 9 kHz to effectively deter, scare, or repel an aggressive animal in a non-detrimental manner.

5. The portable manually operated electromechanical horn device according to claim 1, wherein
said microprocessor circuitry is programmed to cause said piezoelectric speaker to emit a series of short audible one-tone sound signals having the same fundamental frequencies in said repetitive alternating signal pattern;
each said generated sound signal having a decibel level in a range of from about 95 dB to 115 dB, a duration period of from about 50 to 70 milliseconds, and a fundamental frequency in a range of from about 3 kHz to about 5 kHz with an associated second harmonic component frequency in a range of from about 6 kHz to about 10 kHz; wherein
said decibel levels and fundamental frequencies of said first and second generated audible sound signals and their respective said associated second harmonic frequencies in said repetitive alternating signal pattern are all within a frequency range of from about 3 kHz to 10 kHz to effectively deter, scare, or repel an aggressive animal in a non-detrimental manner.

6. The portable manually operated electromechanical horn device according to claim 1, further comprising:
a cushioning pad formed of resilient foam material on said back side of said housing lower portion over which said hand strap extends when formed into said loop.

7. The portable manually operated electromechanical horn device according to claim 1, wherein
said adjustable hand strap is formed of a strip of woven fabric material with mating hook and loop fastener elements.

* * * * *